United States Patent [19]

Lazareck et al.

[11] Patent Number: 5,503,788
[45] Date of Patent: Apr. 2, 1996

[54] AUTOMOBILE SHREDDER RESIDUE-SYNTHETIC PLASTIC MATERIAL COMPOSITE, AND METHOD FOR PREPARING THE SAME

[76] Inventors: Jack Lazareck, 215 Park Blvd. N., Winnipeg, MB, Canada, R3P 0G6; Martin Walsh, 29 Lambeth St., Brampton, Ont., Canada, L6S 4M3

[21] Appl. No.: 273,844

[22] Filed: Jul. 12, 1994

[51] Int. Cl.⁶ .......................... B29C 47/00; B29B 17/02
[52] U.S. Cl. .................. 264/115; 264/118; 264/121; 264/122; 264/126; 264/DIG. 69; 428/903.3
[58] Field of Search .......................... 264/37, 115, 118, 264/121, 122, 126, DIG. 69; 428/542.8, 903.3

[56] References Cited

U.S. PATENT DOCUMENTS

| | | | |
|---|---|---|---|
| 2,031,129 | 2/1936 | Reichmann | 264/63 |
| 2,443,289 | 6/1948 | Bailey | 425/97 |
| 2,769,201 | 11/1956 | Lorenian | 425/133.1 |
| 3,092,437 | 6/1963 | Carter et al. | 264/29.1 |
| 3,386,131 | 6/1968 | Vanzo | 425/190 |
| 3,411,179 | 11/1968 | Gregory et al. | 425/209 |
| 3,506,414 | 4/1970 | Skendrovic | 588/254 |
| 3,880,664 | 4/1975 | Schulze | 588/254 |
| 3,933,515 | 1/1976 | Yang | 106/700 |
| 3,991,005 | 11/1976 | Wallace | 523/129 |
| 4,009,116 | 2/1977 | Bahr et al. . | |
| 4,072,455 | 2/1978 | Beck . | |
| 4,073,661 | 2/1978 | Buzga et al. | 264/37 |
| 4,131,563 | 12/1978 | Bahr et al. . | |
| 4,139,488 | 2/1979 | Knotik et al. . | |
| 4,214,947 | 7/1980 | Berger . | |
| 4,234,632 | 11/1980 | Lubowitz . | |
| 4,253,388 | 3/1981 | Vezzani . | |
| 4,280,921 | 7/1981 | May . | |
| 4,297,322 | 10/1981 | Liu . | |
| 4,511,093 | 4/1985 | Ohkoshi et al. . | |
| 4,585,583 | 4/1986 | Robertson et al. . | |
| 4,728,476 | 3/1988 | Boring et al. . | |
| 4,772,430 | 9/1988 | Sauda et al. . | |
| 4,820,469 | 4/1989 | Walsh et al. | 264/506 |
| 4,821,653 | 4/1989 | Jones . | |
| 4,889,673 | 12/1989 | Takimoto | 264/118 |
| 4,953,457 | 9/1990 | Campo . | |
| 4,986,197 | 1/1991 | Kent . | |
| 4,997,357 | 3/1991 | Eirich et al. . | |
| 5,026,512 | 6/1991 | Chang . | |
| 5,035,189 | 7/1991 | Lunsford . | |
| 5,059,372 | 10/1991 | Klais . | |
| 5,075,057 | 12/1991 | Hoedl . | |
| 5,080,291 | 1/1992 | Bloom | 241/19 |
| 5,082,605 | 1/1992 | Brooks et al. . | |
| 5,093,051 | 3/1992 | Reiniger . | |

(List continued on next page.)

FOREIGN PATENT DOCUMENTS 2026103   3/1992   Canada .

*Primary Examiner*—Robert A. Dawson
*Assistant Examiner*—Kenneth M. Jones
*Attorney, Agent, or Firm*—Nixon & Vanderhye

[57] ABSTRACT

A method is provided for processing a mixture raw automobile shredder residue, and virgin and/or contaminated synthetic plastic material, e.g., raw post consumer plastic waste. By means of this method, automobile shredder residue produced by a conventional automobile shredder is formed into a first stream by being ground in a first granulating zone to a reasonable small granular size using conventional equipment. A second stream comprising virgin and/or contaminated synthetic plastics material is ground in a second granulating zones. The two streams are combined to provide a processable mixture. The processable mixture is introduced into a high intensity, mixer. The processable mixtures transformed into a semi-molten discharge stream by the kinetic energy imparted to the processable mixture by the mixer are simultaneously vented from the mixer. The semi-molten mixture emerging from the mixer is then introduced into an extruder or press where it is formed into a mass of desired shape, and cooled. This method allows for the production of useful, shaped masses from two different classes of materials which have been otherwise treated as waste.

10 Claims, 4 Drawing Sheets

U.S. PATENT DOCUMENTS

| | | |
|---|---|---|
| 5,100,601 | 3/1992 | Heggenstaller et al. . |
| 5,100,603 | 3/1992 | Neefe . |
| 5,141,688 | 8/1992 | Gribble . |
| 5,151,230 | 9/1992 | Damberg . |
| 5,196,620 | 3/1993 | Gustin et al. . |
| 5,215,695 | 6/1993 | Bortoluzzi et al. . |
| 5,240,656 | 8/1993 | Scheeres . |
| 5,265,545 | 11/1993 | Milner . |
| 5,265,979 | 11/1993 | Hansen . |
| 5,273,566 | 12/1993 | Balcar et al. . |
| 5,275,508 | 1/1994 | Hansen . |

AUTOMOBILE SHREDDER RESIDUE-SYNTHETIC PLASTIC MATERIAL COMPOSITE, AND METHOD FOR PREPARING THE SAME

BACKGROUND OF THE INVENTION (i) Field of the Invention

This invention relates to a method for the recycling and reuse of materials heretofore considered non-recyclable. In particular, it relates to the recycling of a mixture of automobile shredder residue with virgin and/or unsorted post consumer synthetic plastic material.

(ii) Description of the Prior Art

Automobile shredder residue consists predominately of non-metallic solid material including plastic, broken glass, rubber, foam rubber, soil, and fabric. It is an unconsolidated, non-homogeneous solid with a medium to dark brown colour. Individual objects are generally identifiable in the waste material. Pieces of automobile headlights, seat covers, seat cushion foam, broken safety glass, wire, automobile arm rests, and rubber gaskets are typical.

The gross bulk density and compactibility of automobile shredder residue varies with the type of infeed material being shredded, the moisture content, the time allowed for compaction on-site, the non-ferrous component, and other factors related to the specific air or water handling processes at any given facility. The Recycling Research Foundation report "Shredder Residue: Environmental Information & Characterization Under RCRA", March 1992, (the contents of which are incorporated herein by reference), reported a bulk density of 267 kg/m$^3$. This figure was the mean value of bulk density determinations generated from various studies.

A typical analysis of the composition of shredder residue by component weight is as follows: fabric and carpet: about 45.6%; plastic: about 5.5%; rubber: about 5.1%; wire and metal: about 8.2%; paper: about 2.7%; dirt and miscellaneous: about 22.1%; glass: about 0.3%; foam rubber: about 8.9%; and wood: about 1.6%.

The scrap metal industry is seeking ways to recycle auto shredder residue. Presently, there are no widespread industry solutions. Nevertheless, automobile shredder residue is being mandated for use as landfill cover.

Synthetic plastic materials in one form or another enter into almost every aspect of our daily lives. Expanded polystyrene which is well known and used for its insulation and shock absorbent properties, and is encountered in fast food restaurants as clam shell containers for hamburgers and drink cups, as plates and trays in sandwich bars and fish and chip shops, as pizza trays, as agricultural containers for seeds and plants; as alternative disposable cups and plates etc., to conventional crockery, as cups at vending machines as yoghurt and frozen yogurt pots, as boxes to transport certain perishable foods, e.g., fish and eggs, as fruit trays, and as protective packaging for a wide range of goods, e.g., telephones, so-called white goods, e.g., refrigerators and cookers, and televisions.

Other synthetic plastic materials which are in common use are as follows: polyethylene which as high density and low density polyethylene is used for containers, e.g., refuse sacks, carrier bags and even especially containers, e.g., blood and plastic containers and as expanded polyethylene is used in film or in sheet form for protective wrapping and packaging easily damaged items in the electronics, glass, china and furnishing industries, polystyrene, high impact polystyrene which is used for making cutlery and some kinds of beverage cups; oriented polystyrene as used in the packaging catering and confectionary industry polyvinyl chloride which is somewhat clear and is used for packaging and wrapping films and for containers, e.g., blister type packages for articles of various kinds; acrylonitrile/butadiene/styrene which is used for many kinds of containers, e.g., cups, yoghurt pots and butter and margarine containers; polypropylene which can be very clear and is used in general packaging where a clear view of the packaged article is required without discoloration, e.g., for food containers as the container covers and for packaging clothing, e.g., shirts, and other articles, e.g., sheets and curtains, and expanded polypropylene which is used for its insulation and impact resistance properties as say end blocks for transporting computers and for automobile bumpers or fenders.

Synthetic plastic material usage has increased yearly, and new synthetic plastic materials which are introduced into the market have different physical and chemical characteristics, e.g, melt temperature, hardness and solubility. The reuse of this multitude of synthetic plastic materials having widely different physical and chemical properties is most difficult. The separation of synthetic plastic material types is impossible by visual inspection. Some polyethylene, polyacrylonitrile, polystyrene, polyesters and polypropylene plastics look and feel much the same, but may have widely different melt temperatures. High density and low density polyethylene have greatly different properties. Removing labels from containers is also an economically impossible task. Containers are also made of layers of different materials.

Scrap synthetic plastic materials, as collected from refuse sites, hereinafter referred to as "post consumer plastic", manufacturing operation wastes, household wastes, "fluff" from shredded automobiles and the like are commonly complex mixtures of many diverse waste materials-paper, thermoplastic products, cured thermosetting products, metals, fibrous products, etc. It is difficult and commonly uneconomic to proceed through one or more sorting and separating steps before the recycling process.

Particularly difficult materials to handle in complex scrap mixtures are cured thermoset resins. Conventionally, these will not melt for remolding purposes, even after separation and isolation from scrap mixtures. Also, they are commonly associated with fibrous reinforcements, e.g., glass fibres, which are equally difficult to separate and reuse.

It is a desirable feature to recycle such synthetic plastic materials. Skips which contain glass, cardboard, paper, wood, textiles, metals and plastic films and plastic bottles from domestic and industrial sources can be collected and taken to a recycling plant. One such recycling plant sorts the glass, metals, wood, contaminates, synthetic plastic materials, paper textiles, waste and burnables from each other. The synthetic plastic materials and paper are fed to a bale press, the bales are fed to a shredder, and the shredded synthetic plastic materials washed, dewatered, dried and then sorted with hydrocyclones. The sorted synthetic plastic material is fed to an extruder and the molten plastics passed through a die which produces synthetic plastic material threads that are cut into pellets by means of rotating blades. The synthetic plastic material pellets are packaged to be ultimately formed into lower grade synthetic plastic materials, e.g., coat hangers, flower pots, garden hoses, pipes, sheeting and bottles etc. The synthetic plastic material is downgraded, because of its melt history, being a mixture of different kinds of synthetic plastic materials and cannot take colour pigments, so that the products end up a dull grey/brown/green colour.

Another synthetic plastic material recycling process uses waste articles made mainly from thermoplastics, in particular high and low density polyethylene and polypropylene. Other thermoplastics can be recycled but under certain controls and polyvinyl chloride may only be present in small proportions without special additives being used. The sources of new material for this process are manufacturers of synthetic plastic material articles, i.e., film, bags, tableware, syringes, toys, book bindings, trays, various domestic articles, e.g., containers and bottles, milk, suppliers who produce their own synthetic plastic material milk bottles and who have redundant and broken milk crates, beverage companies who use synthetic plastic material bottles and containers, and who have broken beer crates, large volumes of below standard articles, e.g., piping, ducting, synthetic plastic material joints, synthetic plastic material medical goods, head waste from manufacturers of synthetic plastic material articles from starting up the machine and after shutdown, synthetic plastic material packaging to be disposed of by manufacturers, distributors and retailers and contaminated or sub-standard granules from synthetic plastic material processors.

The collected synthetic plastic material is sorted, granulated, mixed/blended and then plasticized in an extruder consisting of a large steel screw in a heated steel barrel, by means of the friction caused by the rotating screw melting the synthetic plastic materials. Extruders are expensive machinery whose parts are expensive to replace, require skilled and specialist operators. It has been the traditional view that extruders can generally only be used to recycle homogenous synthetic plastic material waste. This process can produce basic solid synthetic plastic material elongated product, e.g., posts, poles, stakes, boards and a variety of similar shaped products, but again the synthetic plastic material is of down graded nature and could not be mixed with virgin synthetic plastic materials. Specific use of the product are slatted floors for farm animals, pallets, underground cable covers, fencing posts and street and road furniture.

Accordingly, synthetic plastic materials produced for reuse from plastics waste which has been recycled cannot compete with regard to cost and quality with virgin synthetic plastic materials, unless one is dealing with uncontaminated factory scrap synthetic plastic materials which can be fed back into the processing chain for extrusion. Contaminated synthetic plastic material waste has to be subjected to a number of operations before it is suitable for granulation or pelletization, e.g., crushing, shredding, sorting, washing, dewatering and drying. Moreover, there is some synthetic plastic material waste, e.g., computer, audio and video tapes and floppy discs which, because they incorporate metal oxide, and are contained by cassettes of different plastics materials, cannot be recycled in currently available recycling plants. Moreover, incineration is prohibited because metal oxides when burnt give off noxious gases.

Accordingly, there is a need for a process which will permit the recycling and reuse into useful products, of complex mixtures of waste materials which include in their composition substantial quantities of cured thermoset plastics materials. It would therefore be desirable to provide a method which would simultaneously solve these two recycling problems, i.e., of automobile shredder residue and post consumer synthetic plastic material, i.e., unsorted synthetic plastic material waste.

Attempts have been made in the past to make chipboard-like products using thermoplastics-containing scrap materials as the binder or glue therein. As is well known, chipboard is conventionally made of wood chips and liquid/powder uncured thermoset resins. The resins, which act as the binder or glue, are pressed into chipboard products in continuous or discontinuous processes, and subsequently cured under heat and pressure so that the wood chips become held together by the polymerized and cured resins (melamine, phenolics, polyurethanes, etc.). Attempts to use mixed thermoplastics scrap resins, sometimes contaminated with other substances, e.g., paper, metals, textiles, wood, etc. have focused on extrusion, kneading and injection molding processes. These would seem to allow recycling of thermoplastic waste directly into finished or semi-finished products, without separation of the components of the waste or intensive washing thereof.

A combination of a melt chamber and an extrusion screw is known which is used to produce molten synthetic plastic material from foamed thermoplastics waste of scraps, odds and ends, chips and cut ends produced during the processing of synthetic plastic materials and synthetic resins for producing good quality recycled pellets. The extrusion screw extends horizontally beneath and is fed from an elongate melting chamber which is V-shaped in cross-section and extrudes threads of plastics through a suitable die.

In another apparatus involving an extruder, the extrusion screw is arranged vertically but this apparatus suffers from the same disadvantages as those of an extruder having a horizontal screw.

Attempts have been made, and are disclosed in the patent literature, to attempt to solve each of these individual problems, but not, heretofore, both problems simultaneously.

U.S. Pat. No. 4,187,352 issued to Klobbie for example, discloses a process in which unsorted thermoplastic synthetic resin waste material is formed into an article having the working and processing properties of wood by subjecting the mixture to a mixing operation in a housing including a screw/kneading member so that it is extruded into a finished product.

U.S. Pat. No. 3,956,541 issued to Pringle discloses a process for making flexible structural members, namely cable reels, using scrap wire and cable insulation, namely polyvinyl chloride, polyethylene, and other scrap materials. The scraps are shredded in combination with the wire remnants, and the wire is separated from the shredded insulation. This scrap is then mixed with phenolic resin, zinc stearate and wood filler, and compression molded to form flexible objects.

U.S. Pat. No. 4,279,790 issued to Nakajima describes the preparation of composite material compositions of waste paper, thermoplastic resins and other additives, mixed together as the paper is dried from a slurry condition. The inclusion of synthetic rubber, normally a thermoset, is suggested in this patent. The final products are formed by injection molding.

U.S. Pat. No. 4,396,566 issued to Brinkmann discloses a process for the continuous manufacture of sheeting from thermoplastic synthetic resins, in which the resin is used in the form of particles and passed continuously through a preheating zone, and then through a treatment zone, in which it is pressed and compacted to form a visually appealing flexible sheet material. The possibility of using waste strips of thermoplastic synthetic resin is disclosed.

U.S. Pat. No. 4,427,818 issued to Prusinski discloses building blocks made from contaminated scrap materials by a process of mixing and heating, then cooling in molds. While it disclosed the use of a widely varying composition including thermoplastic resins, it did not disclose the use of scraps containing mixtures of thermoplastic and cured thermosetting resins.

U.S. Pat. No. 5,075,057 patented Dec. 24, 1991 by H. K. Hoedl, entitled "Manufacture of Molded Composite Products from Scrap Plastics", provided a procedure whereby scrap plastic materials including thermoplastic and cured thermosetting components may be recycled and molded into products of predetermined shape, without the necessity of separating the different plastics from one another. The patented process included shredding and milling the mixture to reduce it to a fine particle size. The fine particle size mixture was homogenized into a free flowing macrohomogenous powder form. The homogenized mixture was warmed to an elevated temperature at which it maintained its free flowing condition. The warm mixture was dry blended with a reinforcing material or a filler. The blend was then compression molded at elevated temperatures and pressures into a product of pre-determined shape.

U.S. Pat. No. 5,082,605 patented Jan. 21, 1992 by Joe G. Brooks et al, entitled "Method for Making Composite Material", provided a composite material including a discontinuous phase of cellulosic fiber encapsulated in, and bonded to, a continuous phase of a polymeric component containing a major portion of polyethylene. The method included mixing the cellulosic fiber and polymeric component while raising the temperature of the mixture to the encapsulation point. The encapsulated material was maintained within the encapsulation range while the particle size was reduced. Thereafter, the material was extruded while its temperature was controlled within the encapsulation range. The fibers were aligned in the flow direction until the material contacted a heated die. During extrusion, the encapsulated fibers were aligned in the flow direction. As the extrudate passed through the die, the surface temperature was preferably elevated to improve surface properties.

U.S. Pat. No. 5,151,230 patented Sep. 29, 1992 by Dirk H. Damberg, entitled "Process for Production of Products Formed of Polymer Bonded and Granulated Particles", provided an apparatus for continuously manufacturing and forming a cured product of granulate material, polymer glue, and catalyst. The apparatus included a granulator mill which was adapted to shred elastic or inelastic material into small granules and to pass them to a continuous mixer means. A continuous mixer was provided which was adapted continuously to mix a specified amount of inelastic or elastic granulated material, a specified amount of polymer glue, and a specified amount of catalyst. A mold press was provided which received mixed material from the mixer and which molded the mixed material under elevated pressure and temperature into a formed cured product.

U.S. Pat. No. 5,141,688 patented Aug. 25, 1992 by Meirion Gribble, entitled "Method of Making Mineral-Filled Resin Products", provided a method which included thoroughly mixing a powdered mineral material with a minor proportion of a thermosetting resin material. A batch of the resulting formulation, of predetermined weight, was extruded through a rectangular section die to form an elongate extrudate of predetermined length. The extrudate was pressed between a pair of generally planar plates, each of the predetermined length, one of the plates being a cast metal body which had been cast in material bearing an impression of a textured finished building product. The pressed extrudate was then permitted to cure.

U.S. Pat. No. 5,100,603 patented Mar. 3, 1992 by Charles W. Neefe, et al, entitled "Method of Recycling Multimaterial Containers", provided a method whereby empty polymer containers were granulated, mixed with shredded or granulated multimaterial containers and reused to make useful objects without sorting, removing labels or cleaning the containers. The method included cutting the laminated multimaterial containers into granules. The granulated multimaterial was mixed with sugar. That granulated multimaterial granules were mixed with resin granules. The mixture of granules was placed in a mould and the mixture was heated until the resin granules melted, thereby encasing the multimaterial granules. The resins were allowed to cool, and the object was then removed from the mould.

U.S. Pat. No. 4,728,476 patented Mar. 1, 1988 by Douglas J. Boring et al, entitled "Method of Supplying a Moldable Mixture of Materials to an Article Forming Mold of an Injection Molding Machine", provided a method of supplying a mixture of a thermoplastic resin and a low heat conductivity additive to the article forming a mold of an injection molding machine. The mixture was heated in the feed screw of an injection molding machine, to form a flowable mass. Prior to heating, the thermoplastic resin and low heat conductivity additive or filler were mechanically mixed together to form a uniform mixture of resin and filler. After mixing, the mixture was then supplied to the feed screw of an injection molding machine. After such initial heating, the heating of the molten resin/heated filler mixture was continued at a rate to maintain the heated mixture in a standby moldable condition. Prior to the injection of the molten resin/heated filler into an injection machine mold, the molten resin/heated filler was again heated to a higher temperature than the intermediate standby temperature to insure that the plastic article was properly formed.

U.S. Pat. No. 3,880,664 patented Apr. 29, 1975 by Herbert C. Schulze, entitled "Method for Extrusion" provided an improvement in a method for extrusion of materials. Water and cement were mixed before mixing with other ingredients. Fumed silica was also used in the mix.

U.S. Pat. No. 3,991,005 patented Nov. 9, 1976 by Richard A. Wallace, entitled "Structural Material and Method" provided an improved composition predicated upon a discovery that the pyrolysis of incineration residue of industrial or municipal solid waste products was an excellent particulate reinforcement filler material when intimately mixed with an adhesive resinous polymer binder. In carrying out the method of the patented invention, particulate filler was intimately mixed with flowable castable resin binder. Thereafter, the mixture was formed into a desired configuration as by molding or extrusion, and the binder was solidified to form a solid structural composition in which the binder was adhesively bonded to the filler particles.

U.S. Pat. No. 4,280,921 patented Jul. 28, 1981 by John R. May, entitled "Immobilization of Waste Material", provided a method for immobilizing or solidifying waste material which included blending the waste material with powdered metal and subjecting the mixture of waste material and powdered metal to high pressure.

U.S. Pat. No. 5,035,189 patented Jul. 30, 1991 by T. J. Lunsford, entitled "Refuse Recycling System", provided a system for recycling refuse by mixing a predetermined amount of refuse with a predetermined amount of plastic. The mixture was heated until the plastic became liquid. The liquified mixture was formed into a desired shape, e.g., a brick, the mixture was cooled.

U.S. Pat. No. 5,265,545 patented Nov. 30, 1993 to William R. Milner, entitled "Method and Apparatus for Waste Treatment", provided a method of treatment of waste material including the steps of mixing the waste material with a binder and pelletizing the mixture. The pellets were then coated with a non-agglomerating material selected to permit firing of the mixture without pellet agglomeration. The coated pellets were fed to a kiln and fired before being discharged from the kiln. At least some of the heat of firing the pellets was recovered and recycled in the kiln.

U.S. Pat. No. 5,240,656 patented Aug. 31, 1993 by David J. Scheeres, entitled "Treatment of Waste", provided a method and an apparatus for treating contaminated plastics waste. The method included densifying contaminated plastics waste by causing the waste to pass through a heating zone to produce molten contaminated plastics. The molten contaminated plastics was then caused to flow continuously out of the heating zone under the influence of gravity.

U.S. Pat. No. 2,443,289 patented Jun. 15, 1948 by James Bailey, entitled "Apparatus for Shaping Plastics by Extrusion", provided an apparatus for shaping organic plastic materials by extrusion thereof through a die to form elongated or continuous shapes of uniform cross-section. The patented apparatus provided and maintained a separable, and preferably immiscible film of anti-sticking substance or lubricant between the plastic and the die surface.

U.S. Pat. No. 2,769,201 patented Nov. 6, 1956 by Zareh Lorenian, entitled "Screw Extrusion Apparatus for Manufacturing Articles of Thermoplastic and Thermosetting Materials", provided an improved method whereby the material to be worked up was fed into pressing screw or screws tangentially or radially, by means of one or more conveyer screws, which were mounted for rotation in cylinders whose cylindrical surface was formed with interruptions, throughout its length or over part of its length only. The interruptions took the form of recesses of any shape which were arranged longitudinally and whose size and mutual distance was adapted to the actual field of application. These interruptions of the inner cylindrical surface caused the material adhering to the press screw to be torn off or taken off so that the material was at the same time homogenized.

U.S. Pat. No. 4,072,455 patented Feb. 7, 1970 by Erich Beck, entitled "Spiral-Line Press for Thermoplastic Synthetics", provided spiral-line press with a double contra-screw arrangement fixed on a single shaft. The output from the metering zones of the spiral-line were extruded by an outlet fitting which transformed the flows of the extruded matter so that one output was extruded concentrically around the other.

U.S. Pat. No. 2,075,476 patented Mar. 30, 1937 by Albert William Sizer, entitled "Machine for Molding Plastic Substances", provided machines for the molding of plastic substances, mixing machines, continuous crushing or expelling machines of the type in which material was compressed within a chamber by means of a rotary worm element therein. A compression chamber was provided with a worm element having right- and left-hand pitch threading, extending from the centre to the ends respectively. A common inlet was provided for material to be compressed at the centre of the chamber. Die plates were provided at opposite ends of the chamber for the extrusion of compressed material therethrough or alternatively, or additionally, with perforations in the chamber walls for the escape of liquid expressed from the material.

U.S. Pat. No. 4,253,388 patented Mar. 3, 1981 by Luciano Vezzani, entitled "Method and Machine for Compressing and Cutting Random Loaded Scrap Metal", provided a method for compressing and cutting random loaded scrap metal. The method included advancing scrap metal to a cutting zone. A first transversal compression was applied to the scrap metal being advanced. A portion of the scrap metal was guillotined and concurrently a further transversal compression was applied. The machine included a scrap metal conveying trough, a transversally movable pressing plunger adapted for traversing the conveying trough and compacting the conveyed scrap metal, a guillotine block for cutting the compacted scrap metal and a guillotine driven compacting block which was movable perpendicularly to the pressing plunger and cooperated therewith.

U.S. Pat. No. 5,026,512 patented Jun. 25, 1991 by Shao C. Chang, provided a method for manufacturing molded products of thermoplastic material by injection molding or extrusion molding a material containing a thermoplastic material as a primary component and a second polymer or a blend of the thermoplastic material and second polymer as a primary component and an inorganic material. The wall temperatures of the molding cylinder were controlled at different locations of the molding machine. The residence time of the molding material in the cylinder was controlled in response to the cylinder temperature so that the residence time was reduced as the temperature was increased. The temperatures of the discharge end was maintained within the range of the melting temperature of the material.

U.S. Pat. No. 3,411,179 patented Nov. 19, 1968 by Robert B. Gregory et al, entitled "Extruder Screw Mixing Section", provided a plastic extrusion machine including a rotary screw unit having a mixing section at its forward end, which was formed with at least one helical feed channel and at least one helical discharge channel. The feed and discharge channels were so configured as to improve the dispersive mixing ability of the screw in use, i.e., it could simultaneously apply high shear stress upon the higher viscosity thermoplastic constituents and low shear stress upon the lower viscosity thermoplastic constituents. Thereby improved viscosity and temperature homogeneity of the resulting extrudate was attained.

U.S. Pat. No. 3,386,131 patented Jun. 4, 1968 by Marcell Vanzo, entitled "Apparatus for the Continuous Treatment of Rubber and Plastic Material in General", provided an apparatus for the treatment of plastic material. The apparatus included a receiver having a lengthwise extending inlet opening and a discharge opening. A feed screw was rotatably mounted in the receiver and was adapted to feed the material from the inlet opening to the discharge opening. A closing member was quick detachably mounted in the inlet opening to cover a portion thereof in the general lengthwise direction of the receiver. The closing member had an arcuate-shaped portion which formed an uninterrupted continuation of the inner surface of the receiver. The inner surface of the closing member was equally spaced from the addendum envelope of the screw throughout the length of the closing member.

U.S. Pat. No. 5,100,601 patented Mar. 31, 1992 by Anton Heggenstaller et al, entitled "Process for Pressing a Flexurally-Rigid, Beam-shaped Molding", provided a process and devices for producing beam-shaped moldings from fine plant parts mixed with binders in molding presses. The core zone of the molding were formed by an additional amount of fine parts moved there and compacted deliberately. That amount of material acted reactively as a compression zone to the moveable walls surrounding it during the compaction of the molding. Compaction of the molding over its entire cross-section and at the same time particularly great compaction of the peripheral zones of the molding were thus achieved.

U.S. Pat. No. 5,215,695 patented Jun. 1, 1993 by Claudio Bortoluzzi Arenzano et al, entitled "Process for Reclaiming the Residuals of the Manufacture of High Pressure Laminates", provided a process for reclaiming residuals produced from the manufacture of decorative high pressure laminated, and composite materials obtained by the process. Such residuals which included cellulose impregnated with thermosetting resins which were partially condensed, were ground to a predetermined particle size and mixed with a melted mass of thermoplastic resin under controlled pressure and temperature conditions. The mixing time was sufficiently long for completion of the reaction during which physical and chemical interactions occurred between the partially poly-condensed thermosetting resin and the thermoplastic resin. The material so produced was converted into granules for subsequent injection molding.

DESCRIPTION OF THE INVENTION (i) Aims of the Invention

It is seen above that the two recycling problems of automobile shredder residue and post consumer synthetic plastic material i.e., virgin and/or contaminated synthetic plastic polymer has not been simultaneously solved. Accordingly one object of the present invention is to provide an effective solution to the aforementioned problems associated with the disposal of both automobile shredder waste and post consumer synthetic plastic material.

Another object of this invention is to provide a method for compacting, without producing secondary waste materials, such solid waste materials containing various synthetic plastic materials to solidify the waste materials to obtain shaped masses which are useful.

STATEMENTS OF INVENTION

The present invention provides a method for processing a mixture of combined raw automobile shredder residue and virgin and/or contaminated synthetic plastic polymer which comprises the steps of: (a) granulating a first stream comprising raw automobile shredder residue in a first granulating zone to provide granulated automobile shredder residue; (b) granulating a second stream comprising virgin and/or contaminated synthetic plastic polymer in a second granulating zone to provide granulated plastics material; (c) combining the first stream of granulated automobile shredder residue obtained in step (a) and the second stream of granulated plastics material obtained in step (b) to provide a processable mixture; (d) processing the processable mixture obtained in step (c) in a high intensity mixer, such processing transforming the processable mixture in the mixer into a semi-molten discharge stream by kinetic energy imparted to the processable mixture by the mixer, while concurrently venting the mixer to remove particulates therefrom and then directing such particulates vented from the mixer to a particulate recovery system and recovering the particulates therein; (e) forming the semi-molten discharge stream into a shaped mass of desired form; and (f) recycling the recovered particulates to the first stream upstream of the mixer.

OTHER FEATURES OF THE INVENTION

By one feature of the method of this invention, the forming step comprises extruding the semi-molten material through a die to form the shaped mass of desired form, and then cooling.

By another feature of the method of this invention, the forming step comprises pressing the semi-molten material into the shaped mass of desired form and then cooling.

By yet another feature of the method of this invention, the method includes the step of granulating the raw automobile shredder residue while aspirating particulates from the granulating zone.

By still another feature of the method of this invention, the method includes the step of granulating the raw post consumer plastic while aspirating particulates from the granulating zone.

By a still further feature of the method of this invention, the method includes the step of feeding the granulated automobile shredder residue from a feeding zone to a weighing zone while aspirating particulates from the feeding zone.

By yet a further feature of the method of this invention, the method includes the step of aspirating particulates from the processing zone.

By a further feature of the method of this invention, a predetermined weighed amount of granulated automobile shredder residue is mixed with a predetermined weighed amount of granulated unsorted plastic.

By other features of this invention, the shaped mass of desired form is provided either in extruded form or in pressed form.

GENERALIZED DESCRIPTION OF THE INVENTION

The synthetic plastic material may be virgin synthetic plastic material and/or scrap materials. Such synthetic plastic materials which can be recycled and used in the present invention can be of very wide and diverse composition. They may contain thermoplastic materials, e.g., polyethylene, polypropylene, polystyrene, impact polystyrene, polyvinyl chloride, acrylonitrile-butadiene-styrene resins, expanded polypropylene, polyamides, e.g., nylon 66, polyesters, e.g., polyethylene terephthalate or polybutylene terephthalate, polyacrylates, polymethylmethacrylates, polyacrylonitrile, etc., and mixtures of two or more thereof. In fact, such scrap materials are typical plastics and plastics mixtures which would be found in a random sampling of household wastes and industrial plastics scraps. They can be contaminated with or in fact contain substantial quantities of cured thermoset plastics scraps, e.g., polyester thermoset, epoxy, polyurethane, melamine, urea-formaldehyde, crosslinked or cured polybutadiene polyisoprene, poly(butadienestyrene), butyl, ethylenepropylenediene rubbers, SMC (sheet molding compounds), S-RIM (structural resin injection moldings), RTM (resin transfer moldings), RRIM (reinforced resin injection molding-thermoset resins reinforced with fibres of glass, Kevlar, carbon, etc.) and mixtures of two or more thereof. They can contain other scrap materials also, e.g., waste paper, cellulosic fibres, rayons, clay, ceramics, glass, metals, e.g., steel, aluminum and brass, and vegetable materials as commonly found in household and industrial wastes.

The other waste materials used in this invention are the automobile shredder residue previously described.

BRIEF DESCRIPTION OF THE DRAWINGS

In the accompanying drawings.

Figure 1:
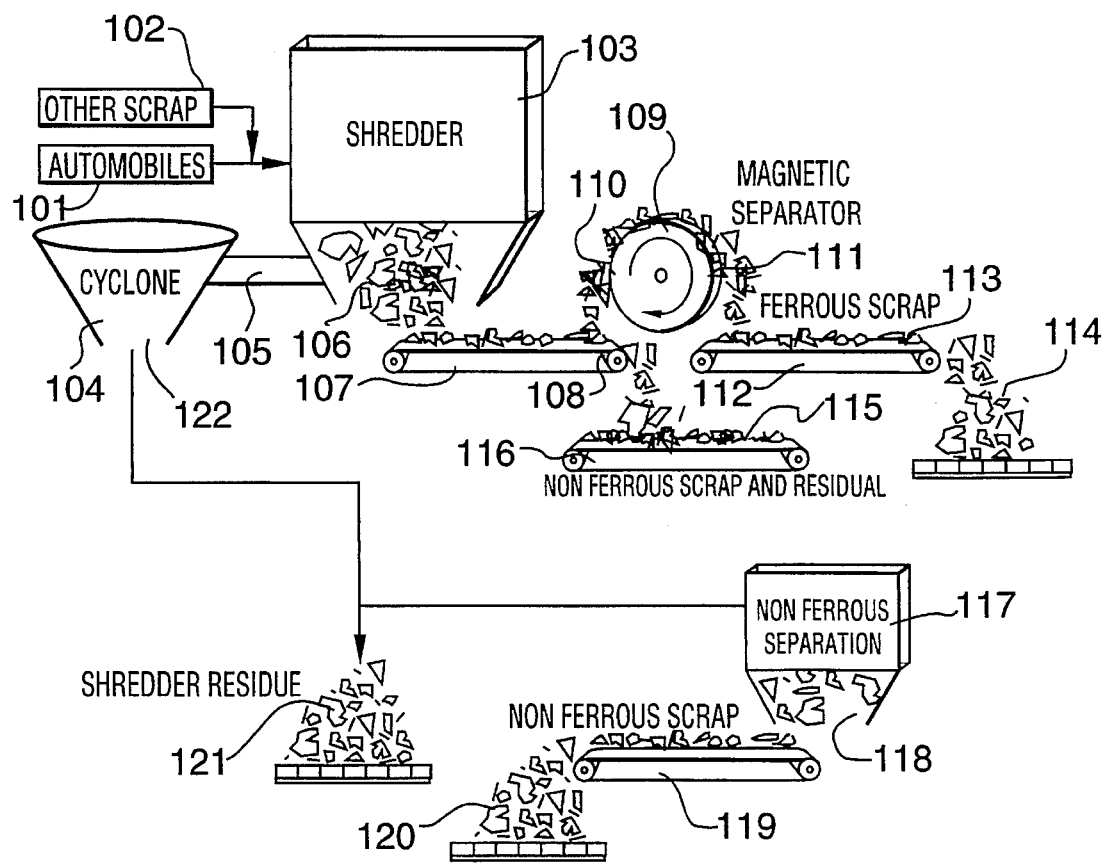
FIG. 1 is a schematic view of a typical process to provide automobile shredder residue.

DESCRIPTION OF PREFERRED EMBODIMENTS (i) Description of FIG. 1

FIG. 1 shows a typical schematic flow sheet for the production of automobile shredder residue. Automobiles 101 and other scrap 102 is fed to a shredder 103 where it is shredded into pieces of various smaller sizes. A cyclone 104 is connected to the outlet 105 of the shredder 10 to draw off particulates. The shredded material 106 falls into a first conveyor belt 107.

The downstream end 108 of the conveyor belt 107 is adjacent a magnetic separator 109. The magnetizable shreds are attached by the magnetic separator 109 at the adjacent perimeter 110 and are discharged from the remote perimeter 111 into a second conveyor belt 112 as ferrous scrap 113, from whence it is discharged to a ferrous scrap storage area 114.

The non-magnetic scrap is discharged from the first conveyor belt 104 as non-ferrous scrap and residue 115, onto third conveyor belt 110 from whence it is fed to a non-ferrous separator 117.

The non-ferrous scrap 105 is discharged from the outlet 118 of the non-ferrous separator 117 into a fourth conveyor belt 119 from whence it is discharged to non-ferrous scrap storage 120.

The residual fines at the top of the non-ferrous separator 117 is drawn off to be deposited in the shredder residue storage 121. The outlet 122 of the cyclone 104 is also deposited in the shredder residue storage 121.

Figure 2:
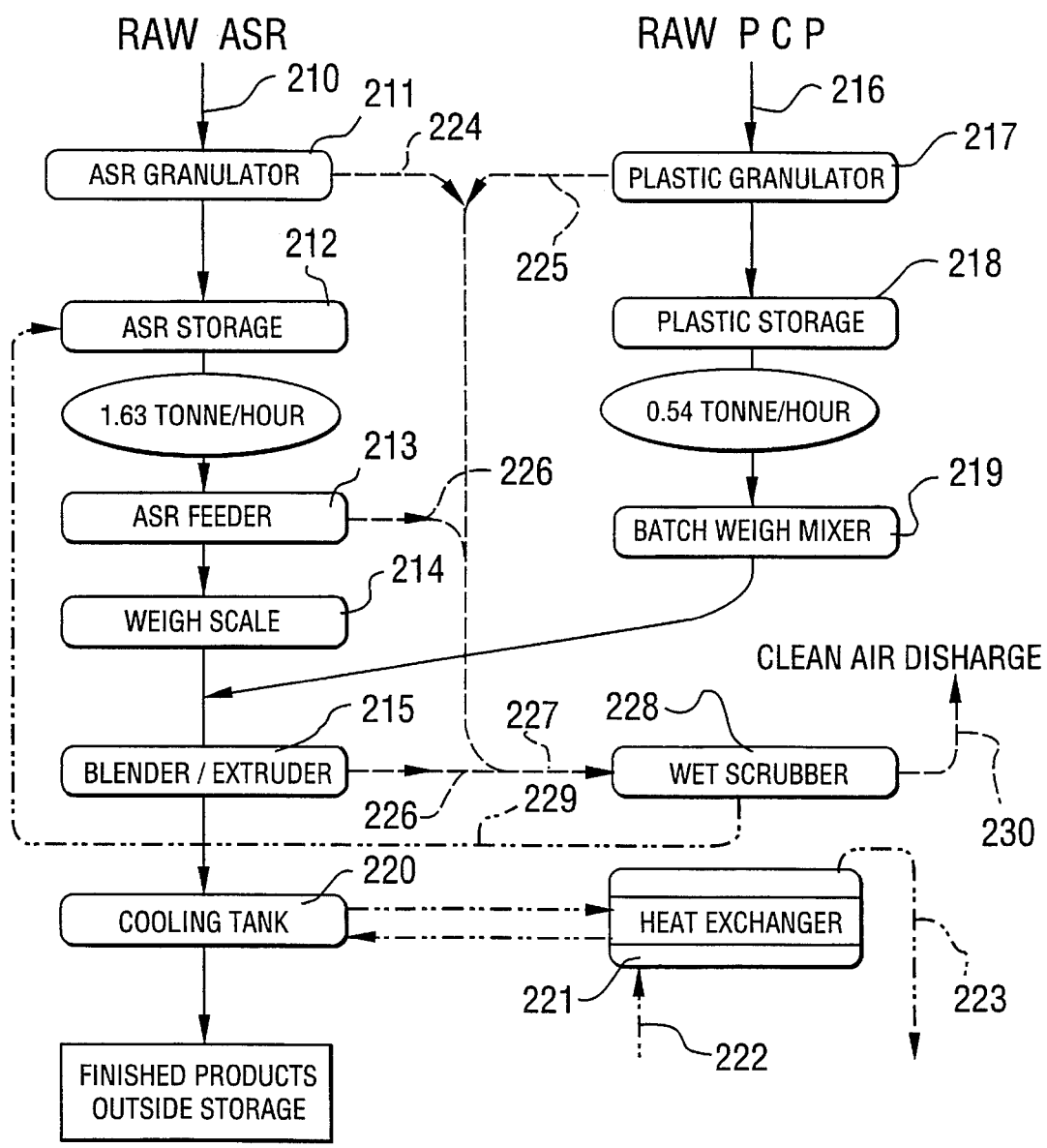
FIG. 2 is a schematic flow diagram of a typical method of this invention.

(ii) Description of FIG. 2

The various apparatus elements which are used to process the automobile shredder waste and the synthetic plastic materials are conventional in the art. The following description is intended to describe only one such suitable conventional combination of apparatus elements.

As seen in FIG. 2, the raw automobile shredder residue 210 is fed to an automobile shredder residue granulator 211 where it is granulated to a suitable size and then is fed to granulated automobile shredder residue storage 212. The granulated automobile shredder residue is discharged at a suitable rate, e.g., a rate of about 1.63 tonne/hour, to a granulated automobile shredder residue feeder 213. The granulated automobile shredder residue feeder 213 feeds material to a residue weighing station, such as weigh-scale 214 so that a predetermined amount is fed to the blender/extruder 215, which will be described further with reference to FIG. 4.

The raw post consumer plastic 216 is fed to a plastic granulator 217 from whence it is discharged to granulated plastic storage and feeder 218. From this storage and feeder 218 a predetermined suitable amount, e.g., about 0.54 tonne/hour, is discharged to a polymer weighing station, such as batch weigh mixer 219, and thence to the blender/extruder 215.

The blender/extruder 215 extrudes product into a cooling tank 220 which is cooled by means of recirculating water at a suitable rate, e.g., at a rate of about 500 L/min, from a heat exchanger 221. The heat exchanger 221 is fed with cooling water supplied at 222, e.g., at about 700 L/min, and likewise the cooling water return 223 is, at a suitable rate, e.g., at a flow rate of about 700 L/min. The finished product is stored at outside storage 215.

The automobile shredder residue granulator 211, the post consumer plastic granulator 217, the automobile shredder residue feeder 213 and the vent from the blender/extruder 215 are connected by respective aspiration lines 224, 225, 226 to a wet scrubber 228 in a manner to be described with reference to FIG. 3, to withdraw particulates therefrom via line 227. Thus, the mixer (i.e., blender/extruder 215) is concurrently vented to remove particulates therefrom, and such particulates are directed to a particulate recovery system (i.e., the wet scrubber 228) in order to recover the particulates and then to recycle them (via line 229) to the first stream of granulated automobile shredder residue upstream of the mixer (i.e., to the ASR storage 212). The aspiration rate is, at a suitable rate, e.g., 0.5 $M^3$/sec. except for the blender/extruder from which it is, at a suitable rate, e.g., 3.2 $M^3$/sec.

A flow of scrubber sludge in line 229 is recycled to the automobile shredder residue storage 212 at a suitable rate, e.g., a rate of, e.g., 21.1 g/sec.

The clean air discharge at vent 230 from the wet scrubber 228 is at, a suitable rate, a rate of, e.g., 4.7 cubic meters per second. The discharge contains, typically hydrocarbons, about 0.0160 grams per second, particulates, about 0.0756 grams per second.

Figure 3:
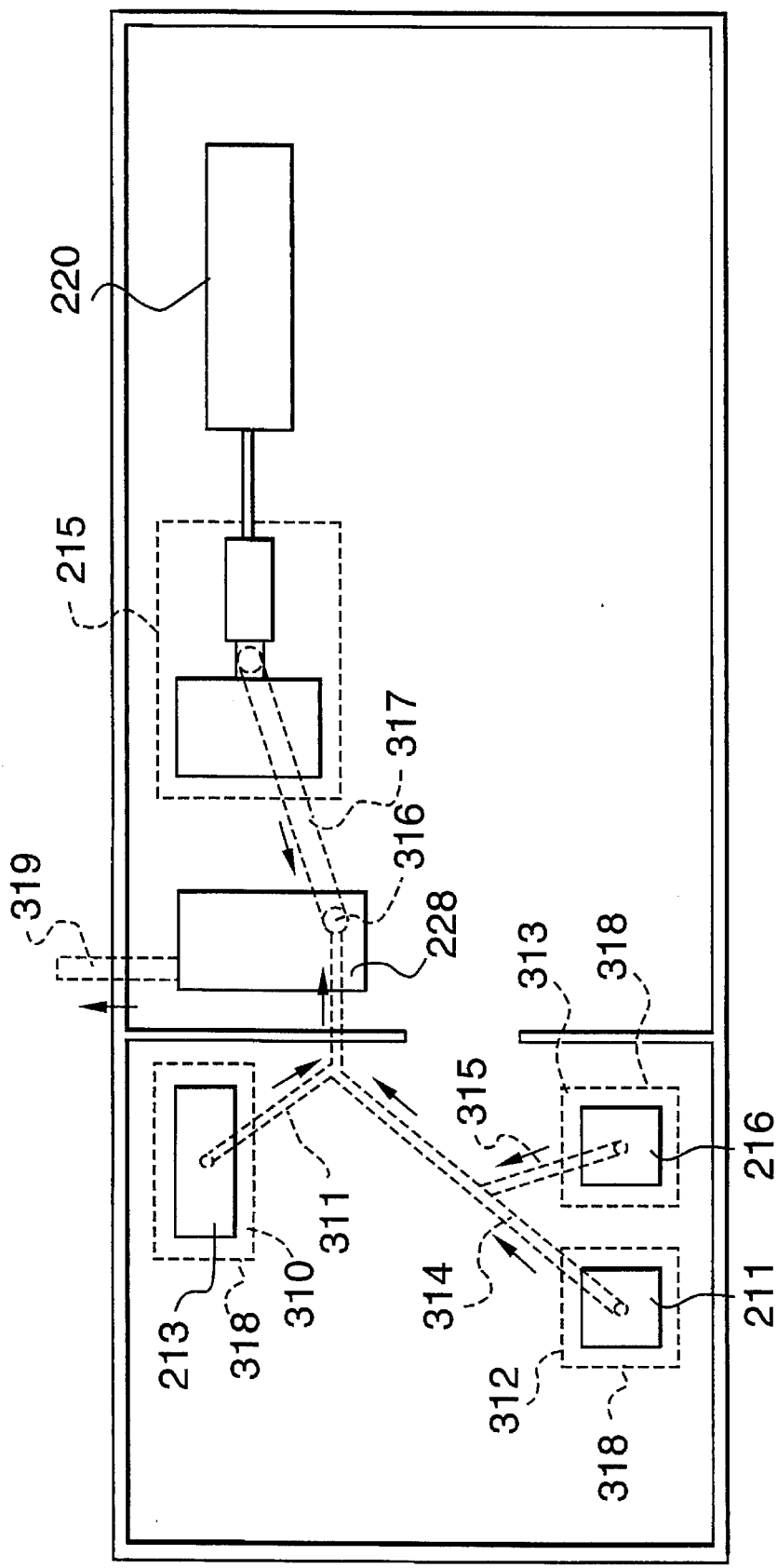
FIG. 3 is a typical flow diagram of the scrubber hoods which form part of the system of this invention.

(iv) Description of FIG. 3

As seen in FIG. 3 the hood 310 of the automobile shredder residue feeder 213 is connected via duct 311 to the wet scrubber 228. The hood 312 of the automobile shredder residue granulator 211 and the hood 313 of the post consumer plastic granulator 216 are connected by ducts 314, 315 to the wet scrubber 228. The vent 316 from the blender/extruder 215 is connected to the wet scrubber by duct 317.

Each of the hoods 310, 312, 313 and the blender/extruder 215 is surrounded by plastic side drapes 318.

The scrubbed air outlet 319 from the wet scrubber 228 is of sufficient size to expel gases at a suitable rate, e.g., about 4.7 $m^3$/sec. at about 250° F.

The extrudate from the blender/extruder 215 is fed to the cooling tank 220.

Figure 4:
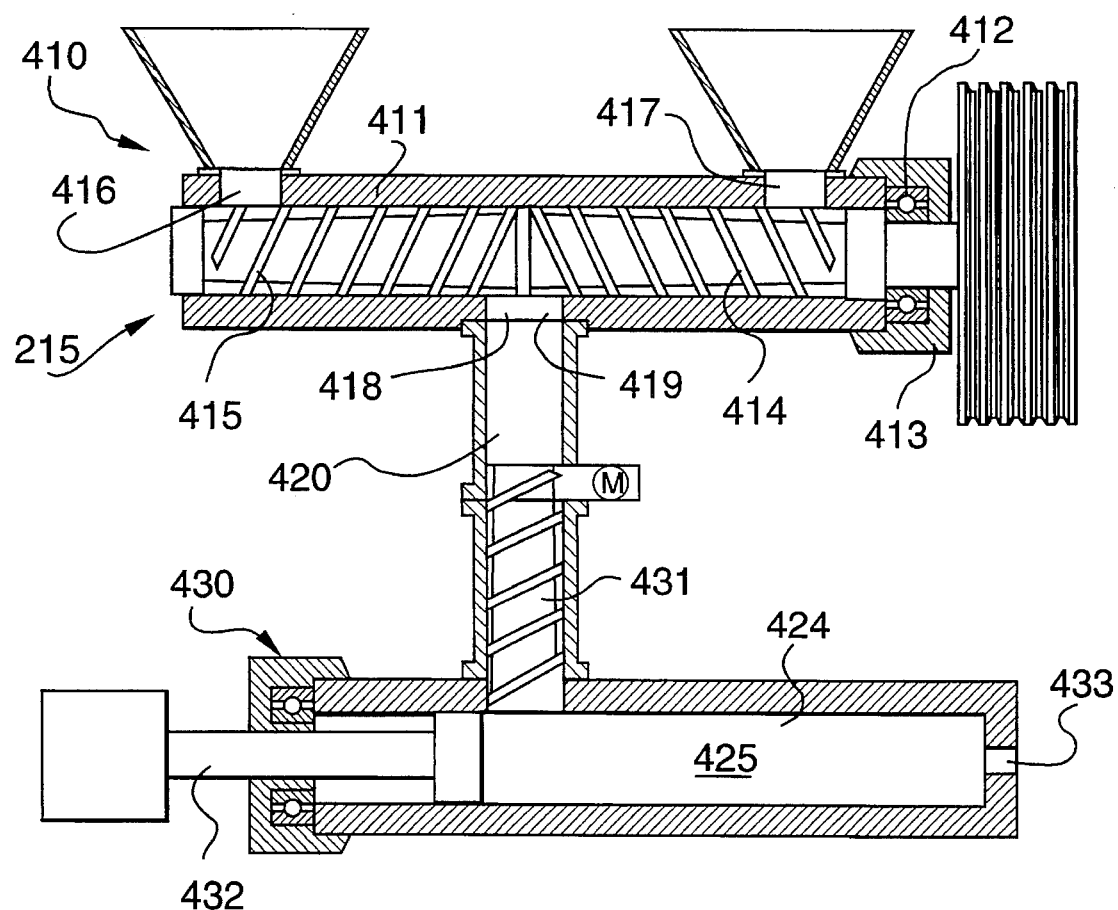
FIG. 4 is a cross-sectional view of a typical blender/extruder forming part of the system of this invention.

(v) Description of FIG. 4

FIG. 4 shows one embodiment of a possible high intensity fluxing-type mixer to transform the mixture into semi-liquid stock, i.e., a blender/extruder 215 in longitudinal cross-section, i.e., a blender unit 410 and an extruder unit 430. Support housing 411 has an axial bearing 412 located in housing 413 and is fitted with shaft 413 having opposite hand spiral blades 414, 415 therein. The blended granulate material enters through input openings 416 and 417 at respective ends of the blender/-extruder 215, into the input zones of the spiral blades. The mixture of the automobile shredder waste and synthetic plastic material is compressed and transported, to the central outlet 418 and 419 in such a way that the two outlets are transformed to a single circular cross-section outlet 420.

FIG. 4 also shows in schematic form one possible embodiment of the extruder portion of the blender/extruder 215. An injection molding machine 430 illustrates any one of the various commercially available injection molding machines having a feed screw 431 driven by motor M for supplying a flowable mass of synthetic plastic material to a suitable mold ram extruder 424. Such injection molding machines normally have a mixture of the automobile shredder waste and synthetic plastic material, metering and blending unit (not shown) secured thereto so that the mixture of the automobile shredder waste and synthetic plastic material to be molded is discharged therefrom into the mixture of the automobile shredder waste and synthetic plastic material receiving chamber 425 of the extruder 424. The outlet 407 of unit 410 is connected to feed screw 431.

Feed screw 431 may be an elongated screw which has a material receiving chamber at upper end and, upon controlled rotation by motor M, ejects a controlled volume of mixture of the automobile shredder waste and synthetic plastic material from its lower end into the article forming ram extruder 424, i.e., the mixture of the automobile shredder waste and synthetic plastic material is injected from screw 431 into 424. As described hereinabove, the kinetic energy of the spiral blades is converted into sufficient heat to heat the mixture of the automobile shredder waste and synthetic plastic material within the chamber 425 so that the material is at a proper temperature for article molding purposes, i.e., to a semi-molten state. The actual extrusion is accomplished by a ram extruder 432 which is operated under sufficient pressure to extrude the semi-liquid mixture of the automobile shredder waste and synthetic plastic material from the zone 425 in which the mixture of the automobile shredder waste and synthetic plastic material has been loaded as above-described the extruding being through die 433, and into the cooling tank 220 as previously described.

(vi) General Description

A typical description of the method is as follows, as briefly described with reference to FIG. 2. Demetalized raw automobile shredder residue is granulated to about minus 19 mm in a granulator, e.g., a 75 kilowatt granulator. An air eductor, e.g., a 100 mm air eductor, pneumatically conveys the granulated automobile shredder residue from the granulator to a storage bin.

Upon arrival, the post consumer synthetic plastic materials are granulated to about minus 10 mm in a granulator, e.g., a 37.5 kilowatt granulator. An air eductor, e.g., a 100 mm air eductor, pneumatically conveys the granulated synthetic plastic material from the granulator to a storage bin. Several bins may be utilized to store different types of granulated synthetic plastic material.

To begin production, granulated automobile shredder residue is transferred from the storage bin to a feeder hopper by a front end loader. The automobile shredder residue is transferred from the feeder hopper to the process area via an auger.

Granulated post consumer synthetic plastic material is augured from the storage bins to a batch weigh mixer. A batch of plastic is made by combining various predetermined amounts of different types of granulated synthetic plastic material. The weighed components of the synthetic plastic material batch are thoroughly mixed, and transferred to the process area in tote bins.

In the process area, the automobile shredder residue and post consumer synthetic plastic materials are individually weighted and augured into the blender dryer at the rate of about 2.17 tonnes per hour. The blender/extruder thoroughly mixes the automobile shredder residue and synthetic plastic material components, and heats the blend to approximately 140° C., thereby driving off any moisture. The hot, dry mixture of the automobile shredder waste and synthetic plastic material is transferred via an enclosed auger to the extruder where it is extruded into shapes and forms. The mixing and extruding processes require approximately 375 kilowatts of electrical energy.

The finished shapes are cooled on racks outside of the building after an initial cooling of about 30 to about 60 minutes in a chilled water bath. Once cool, the products are palletized and readied for shipment.

As shown in FIG. 3, an air pick-up hood is located over each of the two granulators and the feeder hopper to capture dust generated at these points. These hoods are connected by duct work to a Venturi scrubber.

The Venturi wet scrubber is used to control potential emissions from processing automobile shredder residue and post consumer plastic into lumber-like products. One form of Venturi scrubber used herein is a Sly Manufacturing Co. size 5 venturi type wet scrubber. The scrubber is serviced by a second blower, e.g., a 4.72 cubic metre per second blower at a suitable, e.g., 0.08 mm, water column differential pressure. The blower exhausts to the atmosphere via a suitable mm duct, e.g., 559 mm duct. Sludge collected in the Venturi scrubber will be added to the automobile shredder residue feedstock. Make-up water for the Venturi scrubber is drawn from the domestic supply at a suitable rate, e.g., up to about 1 liter per minute depending on ambient atmospheric conditions.

The process area of the operation is under a collection hood with side drapes all around to insure all air flow is directed into the scrubber. The complexity of the superstructure, walkways and feed systems precludes multiple point air pick-ups so the entire process area is enclosed in plastic drapes. All of the air collected from the various hoods and pick-up points is directed to the Venturi scrubber.

The scrubber is serviced by a blower, e.g., 4.72 M$^3$/sec blower at a suitable, e.g., 508 mm water column differential pressure. The blower exhausts to the atmosphere via a suitable duct, e.g., a 559 mm duct. Sludge collected in the Venturi scrubber is added to the automobile shredder residue feedstock. Make-up water for the Venturi scrubber is drawn from the domestic supply at a suitable rate up to 1 liter per minute depending on ambient atmospheric conditions.

The exhaust from the scrubber is discharged to the atmosphere at a suitable volumetric flow rate, e.g., about 4.72 cubic meters per second at ambient (about 25° C.) temperatures through a suitable stack, e.g., one of about 558 mm in diameter extending a suitable distance, e.g., by about 2 meters above the roof line and about 10 meters above ground level.

The compositions according to the invention preferably contain a minimum of about 10 parts by weight of thermoplastic material derived from the macro-homogeneous scrap, with correspondingly about 90 parts by weight of total other material namely other components of the scrap including residues of thermoset materials, added reinforcing materials and/or added fillers. They preferably contain a maximum of about 85 parts by weight of thermoplastic material derived from the macro-homogeneous scrap, but correspondingly about 15 parts by weight of total other materials.

Compositions prepared from mixed scrap materials according to the present invention, i.e., including, in the process, the steps of size reduction and homogenization as described above, can be simply and advantageously used in molding processes to yield high quality products.

In the blender/extruder, the end walls are provided with vents to allow gas to escape to the particulate recovery system. The helical blades rotate at a suitable rate, e.g., about 1750 RPM. The kinetic energy of the mixing is converted to heat, the temperature rising to a suitable temperature, e.g., about 265° F. to about 275° F., which is sufficient to provide an extrudable material.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A method for processing a mixture of combined raw automobile shredder residue and virgin and/or contaminated synthetic plastic polymer which comprises the steps of:

(a) granulating a first stream comprising raw automobile shredder residue in a first granulating zone to provide granulated automobile shredder residue;

(b) granulating a second stream comprising virgin and/or contaminated synthetic plastic polymer in a second granulating zone to provide granulated plastics material;

(c) combining the granulated automobile shredder residue obtained in step (a) and of granulated plastics material obtained in step (b) to provide a processable mixture;

(d) processing said processable mixture obtained in step (c) in a high intensity mixer, said processing transforming said processable mixture in the mixer into a semi-molten discharge stream by kinetic energy imparted to the processable mixture by the mixer while concurrently venting the mixer to remove particulates therefrom and then directing said particulates vented from said mixer to a particulate recovery system and recovering the particulates therein;

(e) forming said semi-molten discharge stream into a shaped mass of desired form; and (f) recycling said particulates to said first stream upstream of the mixer.

2. The method of claim 1 wherein said forming step (e) comprises (i) extruding said semi-molten discharge stream through a die to provide said shaped mass of said desired form, and then (ii) cooling said shaped mass.

3. The method of claim 1 wherein said forming step (e) comprises discharging said semi-molten discharge stream into a mold of said desired form, and pressing said semi-molten material in said mold into said shaped mass of said desired form, and then cooling said shaped mass.

4. The method of claim 1 including the intermediate step of granulating said raw automobile shredder residue while simultaneously aspirating particulates from said first granulating zone, and directing said particulates to said particulate recovery system.

5. The method of claim 1 wherein a predetermined weighed amount of granulated automobile shredder residue from step (a) is mixed with a predetermined weighed amount of granulated virgin and/or contaminated synthetic plastic polymer, thereby providing said processable mixture.

6. The method of claim 5 wherein the amount of said granulated virgin and/or contaminated synthetic plastic polymer is from about 10 parts to about 85 parts by weight of said processable mixture.

7. The method of claim 1 wherein the kinetic energy imparted to said processable mixture heats said processable mixture to a temperature of about 265° F. to about 275° F.

8. The method of claim 2 wherein said forming step (e) includes extruding said semi-molten discharge stream into a cold water bath thereby simultaneously to provide said shaped mass and to cool said extruded shaped mass.

9. The method of claim 5, wherein said predetermined weighed amount of said granulated automobile shredder residue is provided by the steps of:

(g) feeding said granulated automobile shredder residue from said granulating step (a) to an automobile shredder residue weighing station while aspirating particulates;

(h) weighing said granulated automobile shredder residue:

(i) passing said weighed automobile shredder residue to said combining step (c); and (j) directing said aspirated particulates to said particulate recovery system.

10. The method of claim 5, wherein said predetermined weighed amount of said virgin and/or contaminate synthetic plastic polymer is provided by the steps of:

(g) feeding said virgin and/or contaminated synthetic plastic polymer from said granulating step (b) to a virgin and/or synthetic plastic polymer weighing station while aspirating particulates;

(h) weighing said virgin and/or contaminated synthetic plastic polymer (i) passing said weighed virgin and/or contaminated synthetic plastic polymer to said combining step (c); and (j) directing said aspirated particulates to said particulate recovery system.

* * * * *